United States Patent
Wang et al.

(10) Patent No.: US 10,360,659 B2
(45) Date of Patent: Jul. 23, 2019

(54) METHOD AND APPARATUS FOR CONTROLLING IMAGE DISPLAY DURING IMAGE EDITING

(71) Applicant: Tencent Technology (Shenzhen) Company Limited, Shenzhen (CN)

(72) Inventors: Qianyi Wang, Shenzhen (CN); Zhibin Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 6 days.

(21) Appl. No.: 15/692,208

(22) Filed: Aug. 31, 2017

(65) Prior Publication Data

US 2017/0365036 A1    Dec. 21, 2017

Related U.S. Application Data (63) Continuation-in-part of application No. PCT/CN2016/102329, filed on Oct. 18, 2016.

(30) Foreign Application Priority Data

Nov. 26, 2015    (CN) .......................... 2015 1 0843542

(51) Int. Cl.
   *G06K 9/36*    (2006.01)
   *G06T 3/40*    (2006.01)
   (Continued)

(52) U.S. Cl.
   CPC ............... *G06T 3/40* (2013.01); *G06T 11/60* (2013.01); *G06T 7/337* (2017.01)

(58) Field of Classification Search
   None
   See application file for complete search history.

(56) References Cited

U.S. PATENT DOCUMENTS

| | | | | | |
|---|---|---|---|---|---|
| 4,806,919 A | * | 2/1989 | Nakayama | ............ | G06F 3/0481 345/545 |
| 5,172,103 A | * | 12/1992 | Kita | ........................ | G06T 17/00 345/667 |

(Continued)

FOREIGN PATENT DOCUMENTS

| CN | 103337086 A | 10/2013 |
|---|---|---|
| CN | 103578098 A | 2/2014 |

(Continued)

OTHER PUBLICATIONS

Tencent Technology, ISRWO, PCT/CN2016/102329, Jan. 23, 2017, 6 pgs.

(Continued)

*Primary Examiner* — Jayesh A Patel
(74) *Attorney, Agent, or Firm* — Morgan, Lewis & Bockius LLP (57) ABSTRACT

A method is performed at a computing device for controlling image display during image editing, the method including: loading, into the memory, an obtained to-be-edited image; identifying a primary area in the loaded image, the primary area including one or more objects that are automatically recognized as subjects of the loaded image; adjusting the primary area in the loaded image in accordance with a fitting state between the loaded image and a preset template when a center of the primary area is initially located at a center of a display area of the preset template; and displaying, on the screen, the adjusted primary area in the loaded image to occupy the display area of the template completely.

20 Claims, 8 Drawing Sheets

(51) Int. Cl.
*G06T 11/60* (2006.01)
*G06T 7/33* (2017.01)

(56) References Cited

U.S. PATENT DOCUMENTS

| | | | | |
|---|---|---|---|---|
| 5,334,994 | A * | 8/1994 | Takagi | G09G 5/14 345/667 |
| 5,499,327 | A * | 3/1996 | Satoh | G09G 5/14 345/634 |
| 5,612,715 | A * | 3/1997 | Karaki | G06T 3/40 345/428 |
| 5,677,707 | A * | 10/1997 | Abe | H04N 5/45 345/635 |
| 5,867,227 | A * | 2/1999 | Yamaguchi | H04N 5/45 348/565 |
| 5,977,946 | A * | 11/1999 | Mizobata | G09G 5/06 345/418 |
| 6,037,939 | A * | 3/2000 | Kashiwagi | G06F 3/038 715/767 |
| 6,262,694 | B1 * | 7/2001 | Ishimoto | H04N 13/239 345/1.1 |
| 6,313,875 | B1 * | 11/2001 | Suga | H04N 7/142 348/14.08 |
| 6,600,500 | B1 * | 7/2003 | Yamamoto | G06F 3/0481 715/779 |
| 7,864,203 | B1 * | 1/2011 | Fear | G09G 5/003 345/428 |
| 8,388,140 | B2 * | 3/2013 | Sato | H04N 9/3147 345/1.3 |
| 8,656,302 | B2 * | 2/2014 | Nagano | G06F 3/1454 345/530 |
| 8,849,853 | B2 * | 9/2014 | Ptucha | G06T 11/60 707/749 |
| 8,875,056 | B2 * | 10/2014 | Onogi | H04N 5/44543 348/333.02 |
| 8,982,280 | B2 * | 3/2015 | Chen | H04N 5/45 348/565 |
| 9,041,620 | B2 * | 5/2015 | Watanabe | G02F 1/13336 340/1.1 |
| 2002/0024598 | A1 * | 2/2002 | Kunimitsu | B66C 13/46 348/159 |
| 2002/0067433 | A1 * | 6/2002 | Yui | G09G 5/14 348/588 |
| 2002/0081012 | A1 * | 6/2002 | Hakamata | G01N 27/44721 382/132 |
| 2002/0109770 | A1 * | 8/2002 | Terada | H04M 3/567 348/14.08 |
| 2003/0076312 | A1 * | 4/2003 | Yokoyama | H04N 1/3873 345/204 |
| 2003/0215144 | A1 * | 11/2003 | Kito | G06F 16/58 382/190 |
| 2004/0062451 | A1 * | 4/2004 | Kita | G06T 3/60 382/276 |
| 2004/0150659 | A1 * | 8/2004 | Nakano | G06F 3/14 345/629 |
| 2004/0252340 | A1 * | 12/2004 | Komagamine | H04N 1/3875 358/1.18 |
| 2006/0093224 | A1 * | 5/2006 | Uchino | G08B 13/19608 382/232 |
| 2007/0024645 | A1 * | 2/2007 | Purcell | G06F 3/1431 345/634 |
| 2007/0177780 | A1 * | 8/2007 | Chui | G06F 19/321 382/128 |
| 2009/0115855 | A1 * | 5/2009 | Gotoh | H04N 1/00132 348/207.11 |
| 2009/0310018 | A1 * | 12/2009 | Sakashita | G09G 3/3614 348/448 |
| 2010/0088634 | A1 * | 4/2010 | Tsuruta | G06F 3/0481 715/800 |
| 2010/0158471 | A1 * | 6/2010 | Ogikubo | G06F 3/04845 386/278 |
| 2010/0321410 | A1 * | 12/2010 | Jenks | G06F 3/1446 345/676 |
| 2011/0246947 | A1 * | 10/2011 | Hirohata | H04N 1/0035 715/838 |
| 2013/0069870 | A1 * | 3/2013 | Ichieda | G06F 3/033 345/157 |
| 2014/0205206 | A1 * | 7/2014 | Datar | G06T 3/0012 382/298 |
| 2015/0055887 | A1 * | 2/2015 | Hasegawa | G06T 11/00 382/284 |
| 2015/0207957 | A1 * | 7/2015 | Lee | G06F 3/1208 358/452 |

FOREIGN PATENT DOCUMENTS

| | | | |
|---|---|---|---|
| CN | 103634650 A | 3/2014 | |
| CN | 104243846 A | 12/2014 | |
| CN | 104573715 A | 4/2015 | |
| CN | 105096363 A | 11/2015 | |
| JP | 2001333270 A | * 11/2001 | |
| JP | 2004105163 A | * 4/2004 | |
| JP | 2006185058 A | * 7/2006 | |
| KR | 20150039049 A | * 4/2015 | G06F 3/04845 |

OTHER PUBLICATIONS

Tencent Technology, IPRP, PCT/CN2016/102329, May 29, 2018, 5 pgs.

* cited by examiner

METHOD AND APPARATUS FOR CONTROLLING IMAGE DISPLAY DURING IMAGE EDITING

RELATED APPLICATION

This application is a continuation-in-part of PCT/CN2016/102329, entitled "METHOD AND DEVICE FOR CONTROLLING PICTURE DISPLAY IN PICTURE EDITING" filed on Oct. 18, 2016, which claims priority to Chinese Patent Application No. 201510843542.X, filed with the State Intellectual Property Office of the People's Republic of China on Nov. 26, 2015, and entitled "METHOD AND APPARATUS FOR CONTROLLING IMAGE DISPLAY DURING IMAGE EDITING", both of which are incorporated herein by reference in their entirety.

FIELD OF THE TECHNOLOGY

The present disclosure relates to the field of computer application technologies, and in particular, to a method and an apparatus for controlling image display during image editing.

BACKGROUND OF THE DISCLOSURE

With the rapid development of computer application technologies, various image editing applications emerge. By using simple and practical image editing functions of the image editing applications, a user can easily produce images with various effects. Therefore, image editing applications have been popular among a wide range of users.

In existing image editing applications, multiple templates of different types are usually preset for selection by a user, so that after the user selects a to-be-edited image and a template, the to-be-edited image in a display area of the template. In the image display process, the size of the display area of the template selected by the user is not always exactly equal to the size of the image. To fit the image to the display area, a common method is to directly select a central area of the image and display the central area in the display area of the template. However, in this case, content presented in the display area of the template to the user may not be important content in the image.

In addition, the user usually adjusts the range of the display area of the template as required, for example, drags the right border of the display area to enlarge the range of the display area. After the range of the display area is changed, to fit the previous image to the changed display area again, a common method is to continue to present a part of the image that is not displayed to the user along the dragging direction. Similarly, in this case, content presented in the display area of the template to the user may not be important content in the image.

As described above, in the existing image display process during image editing, the accuracy of image display is unsatisfactory.

SUMMARY

Based on the above, embodiments of the present application provide a method for controlling image display during image editing capable of improving the accuracy of image display.

In addition, embodiments of the present application provide an apparatus for controlling image display during image editing capable of improving the accuracy of image display.

To resolve the foregoing technical problem, technical solutions used by the present disclosure are as follows:

A method for controlling image display during image editing comprises: loading an obtained to-be-edited image; identifying a primary area in the loaded image; embedding the image into a preset template; and displaying the primary area in the center of the display area of the template, and adjusting the image according to a fitting state between the embedded image and the display area, so as to fit the image to the display area.

An apparatus for controlling image display during image editing includes: a loading module, configured to load an obtained to-be-edited image; an identifying module, configured to identify a primary area in the loaded image; an embedding module, configured to embed the image into a preset template; and a fitting module, configured to display the primary area in the center of the display area of the template and adjust the image according to a fitting state between the embedded image and the display area, so as to fit the image to the display area.

Compared with the existing technology, the present disclosure has the following beneficial effects.

By identifying a primary area of a loaded to-be-edited image, embedding the to-be-edited image into a preset template, displaying the identified primary area in the center of a display area of the template, and dynamically adjusting the image according to a fitting state between the embedded image and the display area, the image is fitted to the display area adaptively. That is, by displaying the primary area in the center and dynamically adjusting the image adaptively, the image displayed in the display area of the template is the image containing important content, so that a problem that content presented in the display area of the template to a user may not be important content in the image is resolved, the accuracy of image display is improved effectively and user experience is improved.

DESCRIPTION OF EMBODIMENTS

Typical implementations showing features and advantages of the present disclosure are described in detail below. It should be understood that the present disclosure may have some variations in different implementations without departing from the scope of the present disclosure, and descriptions and figures are essentially used for illustrating the present disclosure and are not intended to limit the present disclosure.

Figure 1:
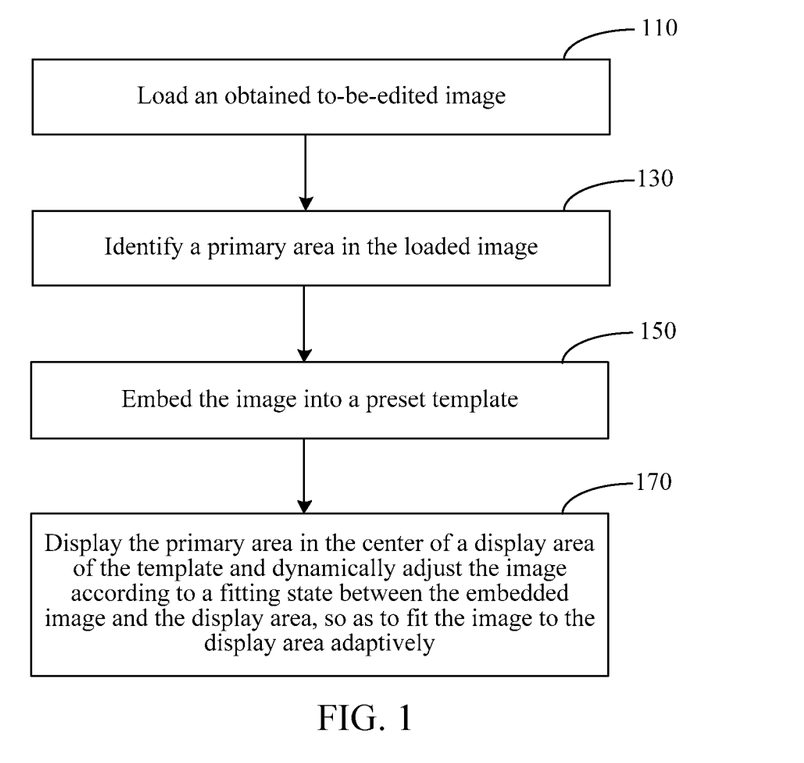
FIG. 1 is a flowchart of a method for controlling image display during image editing according to an embodiment.

Refer to FIG. 1 for a method for controlling image display during image editing in an embodiment. The method may be applied to a client terminal, the client terminal may be operated on a computing device, and the computing device may be a smartphone, a tablet, or a computer, each having one or more processors, a screen, and memory storing programs to be executed by the processors for controlling the image display. The method includes the following steps:

Step S110: Load an obtained to-be-edited image.

An approach to obtain the to-be-edited image may be scanning the to-be-edited image, selecting from images pre-stored in a media library or directly taking a photo of an external object.

In this embodiment, loading the obtained to-be-edited image is implemented by a client terminal, so that the loaded image can complete the image display control during image editing on the client terminal.

The client terminal may be running a software application for image editing, such as an image editing application, or may be a web page application for image editing, such as an image editing website.

Step S130: Identify a primary area in the loaded image.

The primary area refers to main content in the image, for example, the primary area in an image of a person should be the person. In some embodiments, the operation of identifying a primary area in the image implements one or more machine learning methods (e.g., pattern recognition) for object detection, classification, and computer vision segmentation. Pattern recognition is the process of classifying input data (images) into objects or classes based on key features (e.g., facial characters), which can be supervised or unsupervised classification. In this application, the output of this process is the primary area that starts at the center region of the image and expands in both horizontal and vertical directions until that it includes the subjects of the loaded image. In some embodiments, the identification of the primary area is supported using one or more image capturing parameters (e.g., depth of field, focal length, etc.).

Further, if the identifying of the primary area succeeds, the primary area is recorded by the client terminal, so as to display the primary area in the subsequent process of image editing. If the identifying of the primary area fails, the client terminal obtains, by means of listening, a manual adjusting operation triggered by a user in the loaded image, and the client terminal is assisted by the manual adjusting operation to identify the primary area until the identifying of the primary area succeeds.

By identifying a primary area in a loaded image, it is beneficial to better present main content of the image to a user, thereby improving the accuracy of image display.

Step S150: Embed the image into a preset template.

The template may be a fixed format of a display area constituting the image and is preset by a client terminal. The client terminal may preset multiple template types for selection by the user.

For example, a single splice template includes one display area; a double splice template includes two display areas, and the two display areas may be spliced up and down or spliced left and right; and a multi splice template is spliced by multiple display areas in different splicing manners.

After the user selects the preset template, the image is embedded into the preset template by the client terminal and displayed in the display area of the template.

Step S170: Display the primary area in the center of a display area of the template and dynamically adjust the image according to a fitting state between the embedded image and the display area, so as to fit the image to the display area adaptively.

The size of the embedded image is not always exactly equal to the size of the display area of the template, and the primary area of the image represents main content in the image. Therefore, after the image is embedded into the preset template, by displaying the primary area in the center of the display area of the template, that is, aligning a center position of the primary area with a center position of the template, it is ensured that the primary area, that is, the main content in the image, can be presented to the user.

If the template with the embedded image cannot display the primary area completely, or a display area without image display still exists in the template, the client terminal will fill the display area without image display according to a part of the image that is not displayed, so as to fit the image to the display area.

Specifically, relative to borders of the display area of the template and classified according to the part of the image that is not displayed, the fitting state between the image and the display area includes: the image being fitted to the width and height of the display area, the primary area extending beyond the display area, two opposite borders of the display area extending beyond the image, and any border of the display area extending beyond the image.

The first type indicates that the image is fitted to the display area, that is, all borders of the template do not extend beyond the image. In this case, the client terminal does not work on the image. The later three types indicate that the image is not fitted to the display area. It may be that the primary area is not displayed completely, or display areas without image display exist in two opposite sides of the template, or a display area without image display exists in any side of the template. In this case, the client terminal needs to dynamically adjust the image adaptively until the image is fitted to the display area.

In some embodiments, the operation is further divided into two steps. The first step is to adjust the primary area in the loaded image in accordance with a fitting state between the loaded image and a preset template when a center of the primary area is initially located at a center of a display area of the preset template. In other words, the starting point of this adjustment process is to have the center of the primary area located at the center of the display area of the preset template and the ending point of this adjustment process is to make sure that there is no empty room left in the display area and, after adjustment, the display area of the template is completely occupied by the adjusted primary area (which may or may not be the same as the originally identified primary area). During this process, the primary area should not be adjusted to leave out any subject of the loaded image. To so, it is important to continuously measure the fitting state between the loaded image and the preset template, which is dependent upon at least one of a size comparison of the loaded image and the preset template and a position of the primary area in the loaded image. For example, if the size of the loaded image is smaller than that of the preset template, the primary area is enlarged by a ratio in both horizontal and vertical directions to occupy the display area completely. But when the size of the loaded image is greater than that of the preset template, whether or not the primary area should be reduced by a ratio depends in part on the position of the primary area in the loaded image. When the primary area is located near the center of the loaded image, it may be able to occupy the display area completely by shifting a predefined offset without having to be reduced as long as such shifting does not push any subject of the image out of the primary area.

In other words, the operation of adjusting the primary area in the loaded image in accordance with a fitting state between the loaded image and a preset template is a combination of changing a size of the loaded image by a ratio determined by the fitting state and shifting the loaded image by an offset determined by the fitting state. For example, when the fitting state indicates that the primary area extends beyond the display area in both a vertical direction and a horizontal direction, the primary area is reduced by a ratio determined by the fitting state such that the reduced primary area no longer extends beyond the display area in at least one of the vertical direction and the horizontal direction. When the fitting state indicates that the loaded image is within two opposite borders of the display area along a predefined direction, the loaded image is enlarged by a ratio determined by the fitting state such that the enlarged image is no longer within the two opposite borders of the display area along the predefined direction. When the fitting state indicates that the loaded image is within at least one border of the display area along a predefined direction, the loaded image is shifted by an offset determined by the fitting state such that the shifted image is no longer within the at least border of the display area along the predefined direction. In some embodiments, the shifted image is further scaled by a ratio determined by the fitting state such that no subject of the loaded image is outside the display area.

By means of the processes described above, a client terminal can accurately display a primary area of an image in a display area of a template and dynamically adjust the image adaptively according to changes of the range of the display area or changes of the image (for example, the range of the display area is scaled up, or a replaced image is scaled down), dynamic display of the image in the display area of the template is achieved, and main content in the image is presented in the display area of the template to a user, thereby effectively improving the accuracy of image display, obtaining a better effect of image display, and improving experience of the user.

In an embodiment, after S170, the method described above further includes the following steps: obtaining, by means of listening, an operation triggering adjusting a border of the display area, so as to adjust the range of the display area by means of the operation. In other words, when a user of the client terminal adjusts a border of the display area, the first-adjusted primary area needs to be re-adjusted to fit into the updated display area according to the same set of rules, i.e., the subjects of the loaded image be kept in the display area and there is no empty room in the display area not occupied by the loaded image. To do so, the client terminal may perform the same set of operations as described above in connection with FIG. 1.

In an embodiment, the range of the display area is adjusted in response to the operation of dragging the border in the display area.

The range of the display area is limited. If the range of the display area needs to be changed, the client terminal obtains, by means of listening, the operation triggering dragging the border in the display area and adjusts the range of the display area by means of the operation, so as to change the range of the display area.

It should be noted that, the operation triggered by the user may be an operation triggered by adjusting a border of the display area, or an operation triggered by dragging an angle of the display area. In this case, two adjacent borders in the display area are dragged.

Figure 3:
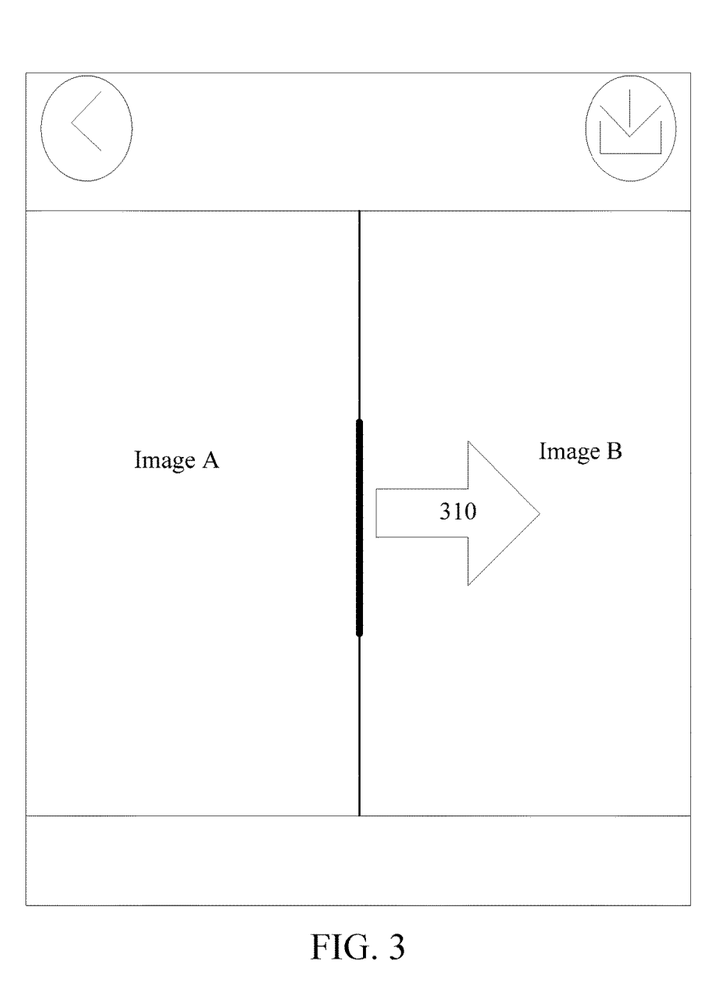
FIG. 3 is a schematic diagram of obtaining, by means of listening, an operation triggering dragging a border in a display area, and adjusting the range of the display area by means of the operation according to an embodiment.

As shown in FIG. 3, in the template, the displayed area is adjusted rightwards by means of an operation 310 triggered by the user dragging rightwards the right border in the display area, thereby scaling up the range of the display area.

Further, after the range of the display area is changed, based on that the primary area is displayed in the center, the fitting state between the image and the display area may also be changed correspondingly. Therefore, a dynamic adjusting of the image is adaptively triggered in the display area of the template, so as to fit the image to the display area again.

The process of S170 is performed whether in the first adaptive fitting between the image and the displaying area, or the second adaptive fitting triggered by changes of the range of the display area or changes of the image, so as to achieve dynamic display of the image in the display area changed dynamically.

It is worth mentioning that to achieve the dynamic display of the image in the display area changed dynamically, if the preset template is changed; processes from S150 to S170 are performed.

Figure 2:
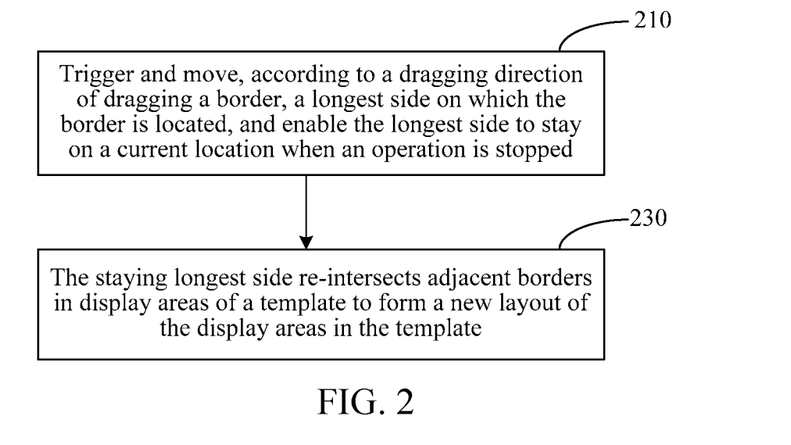
FIG. 2 is a flowchart of a method for controlling image display during image editing according to another embodiment.

Referring to FIG. 2, in an embodiment, the template includes a display area in which dragging the border is triggered and at least one surrounding display area.

In this embodiment, the template preset by the client terminal is spliced by multiple display areas in different splicing manners. Therefore, when one of the display areas changes the range of the display area by means of triggering dragging the border, ranges of other surrounding display areas adjacent to the display area will be affected and changed.

Further, after S170, the method described above further includes the following steps.

Step S210: Trigger and move, according to a dragging direction of dragging the border, a longest side on which the border is located and enable the longest side to stay on a current location when the operation is stopped.

Step S230: The staying longest side re-intersects adjacent borders in display areas of the template to form a new layout of the display areas of the template.

The longest side on which the border is located may be the border, or may be constituted by borders of multiple display areas together. In all cases, after the longest side is triggered to move, ranges of the displayed areas on two sides of the longest side will be changed, so as to form the new layout of the display areas of the template.

In an embodiment, the longest side on which the border is located is moved according to the dragging direction of the operation; and the display areas in the template are re-formed according to the location of the longest side when the operation is stopped. After the range of the display area is adjusted, other display areas in the template are re-formed according to the location of the longest side when the operation is stopped, the display area being adjacent to the other display areas by means of the longest side.

Figure 4:
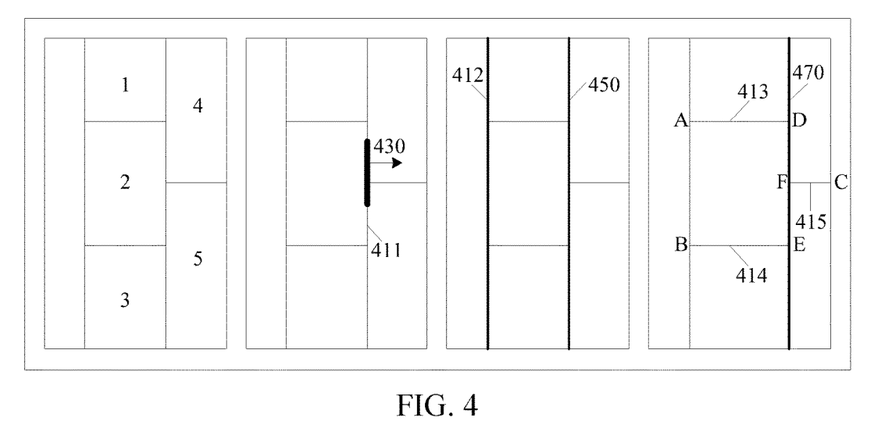
FIG. 4 is a schematic diagram of triggering and moving, according to a dragging direction of dragging the border, a longest side on which the border is located and forming a new layout of display areas of the template in FIG. 2.

As shown in FIG. 4, when the longest side 450 on which the border is located is constituted by borders of multiple display areas together, according to the dragging direction 430 of dragging the border 411, the longest side 450 on which the border 411 is located is triggered to move along the dragging direction 430, and a border 412 not adjacent to the longest side 450 and corresponding vertices A, B, C are not moved.

When the operation is stopped, a longest side 470 staying on the current location is formed. The staying longest side 470 re-intersects the adjacent borders 413, 414, 415 of the display areas of the template, and new vertices D, E, F are formed respectively, so as to form a new layout of the display areas in the template, that is, ranges of the display areas 1, 2, 3 are scaled up and ranges of the display areas 4, 5 are scaled down.

Figure 5:
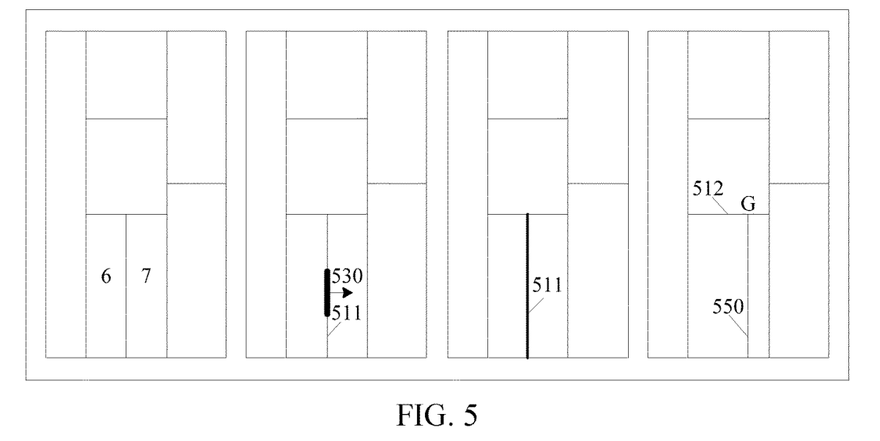
FIG. 5 is a schematic diagram of triggering and moving, according to a dragging direction of dragging the border, a longest side on which the border is located and forming a new layout of display areas of the template in FIG. 2.

As shown in FIG. 5, when the longest side 511 on which the border is located is the border 511, according to the dragging direction 530 of dragging the border 511, the longest side 511 on which the border 511 is located is triggered to move along the dragging direction 530, and other borders not adjacent to the longest side 511 and corresponding vertices are not moved.

When the operation is stopped, the longest side 550 staying on the current location is formed. The staying longest side 550 re-intersects the border 512 adjacent to the display areas in the template, and a new vertex G is formed, so as to form the new layout of the display areas in the template, that is, the range of the display area 6 is scaled up and the range of the display area 7 is scaled down.

Figure 6:
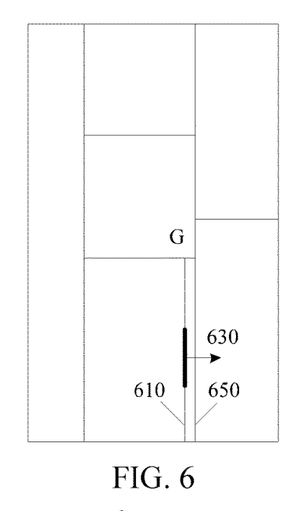
FIG. 6 is a schematic diagram of triggering and moving, according to a dragging direction of dragging the border, a longest side on which the border is located and forming a new layout of display areas of the template in FIG. 2.

It is worth mentioning that, in this embodiment, the dragging of the border is limited. As shown in FIG. 6, the longest side 610 on which the border 610 is located is dragged along the dragging direction 630, when a distance between the border 610 and the border 650 reaches a preset smallest width, the border 610 cannot be dragged along the dragging direction 630 anymore.

Further, after the ranges of other display areas are changed, based on that the primary area is displayed in the center, the fitting state between the image and the other display areas may be changed correspondingly. Therefore, the dynamic adjusting of the image will also be triggered in the other display areas of the template, so that the image is adaptively fitted to the other display areas again, that is, the process of S170 is performed, thereby achieving the dynamic display of the image in the display area changed dynamically.

As described above, the fitting state between the image and the display area includes: the image being fitted to the height and width of the display area, the primary area extending beyond the display area, two opposite borders of the display area extending beyond the image, and any border of the display area extending beyond the image.

Based on that the primary area is displayed in the center of the display area of the template, the step of dynamically adjusting the image according to the fitting state between the image and the display area varies with the different fitting states between the image and the display area. The step is described below with reference to FIG. 7 to FIG. 9.

Figure 7:
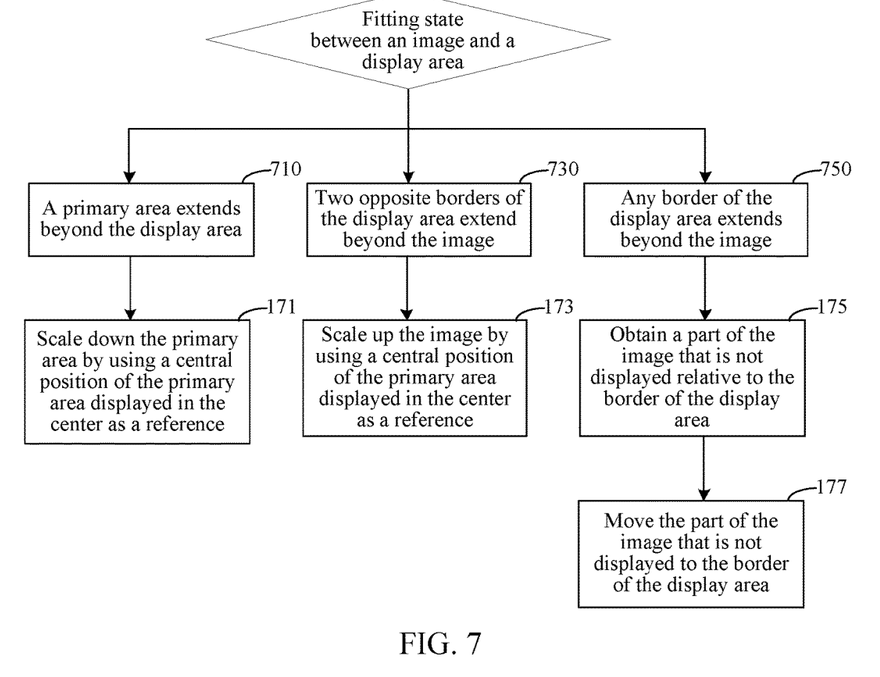
FIG. 7 is a flowchart of a method for dynamically adjusting the image according to the fitting state between the embedded image and the display area in FIG. 1.
Figure 8:
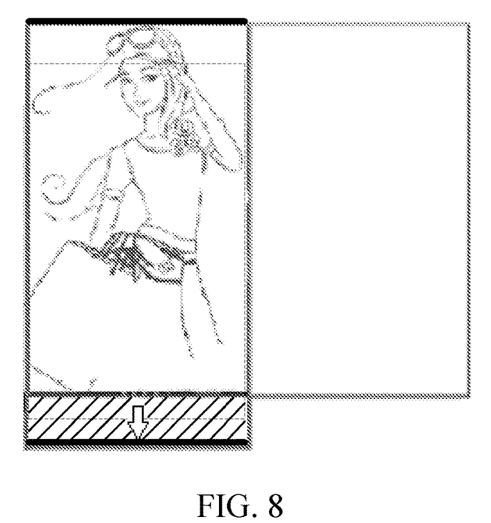
FIG. 8 is a schematic diagram of the fitting state that two opposite borders of the display area extend beyond the image in FIG. 7.

In an embodiment, the fitting state is that the primary area extends beyond the display area 710 and the step of dynamically adjusting the image according to the fitting state between the embedded image and the display area includes the following steps:

Step S171: Scale down the primary area by using a central position of the primary area displayed in the center as a reference.

In this embodiment, whether in the first fitting or the second fitting after the range of the display area or the image is changed, after the primary area is displayed in the center of the display area of the template, if the primary area displayed in the center extends beyond the display area, to ensure that the image presented in the template to the user includes important content in the image, that is, the primary area, the extending primary area is scaled down by using the central position of the primary area as a reference, so that the scaled-down primary area is fitted to the display area.

In an embodiment, the fitting state is that two opposite borders of the display area extend beyond the image 730 and the step of dynamically adjusting the image according to the fitting state between the embedded image and the display area includes the following steps:

Step S173: Scale up the image by using a central position of the primary area displayed in the center as a reference.

For example, after the display area is fitted to the image, that is, the display area is completely filled by the embedded image, if a lower border of the display area is continue to be dragged downward, a display area (as shown in the shadow filling box in FIG. 8) without image display will occur in the template because the image in the vertical direction has been displayed in the display area completely before.

Figure 9:
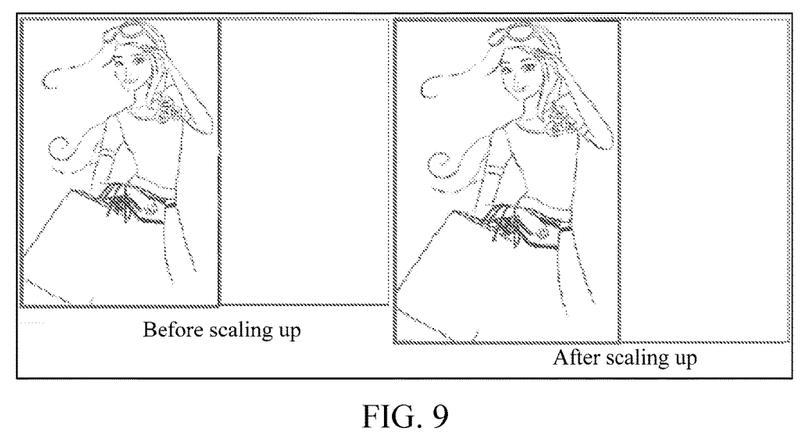
FIG. 9 is a schematic diagram of scaling up the image by using a center position of the primary area displayed in the center as a reference in FIG. 7.

In this case, the client terminal aligns the central position of the primary area with the central position of the display area. Based on that the primary area is displayed in the center of the display area of the template, in the two opposite borders of the display area, the upper border and the lower border (shown as the bold sold line in FIG. 8) both extend beyond the image (shown as the dashed line in FIG. 8) of which the primary area is displayed in the center, that is, the fitting state is that the two opposite borders of the display area extend beyond the image 730. At this time, the image is scaled up by using the central position of the primary area displayed in the center as a reference, so that the scaled-up image is fitted to the display area, as shown in FIG. 9.

By means of the process described above, based on that the primary area is displayed in the center, the scaling image is capable of being fitted to the display area. Therefore, it is ensured that content presented in the display area of the template includes important content in the image, improving the accuracy of image display, obtaining a better effect of image display, and improving experience of the user.

In an embodiment, the fitting state is that any border of the display area extends beyond the image 750.

It can be understood that, in this embodiment, that any border of the display area extends beyond the image 750 may be that only one border in the display area extends beyond the image or any two adjacent borders in the display area extend beyond the image, while that two opposite borders of the display area extend beyond the image is not included.

Further, the step of adjusting the image according to a fitting state between the embedded image and the display area includes the following steps.

Step S175: Obtain a part of the image that is not displayed relative to the border of the display area.

When the fitting state is that any border of the display area extends beyond the image 750, that is, a display area without image display exists on one side relative to the border of the display area in the template, in this case, to fill the display area without image display, the client terminal determines, relative to the border of the display area, that whether the part of the image that is not displayed can be obtained.

If the part of the image that is not displayed can be obtained, perform Step S177 to fill, by the client terminal, the display area without image display with the part of the image that is not displayed.

If the part of the image that is not displayed cannot be obtained, it means that the image is completely displayed in the display area of the template. At this time, the image is scaled up by using the central position of the primary area displayed in the center as a reference, so that the client terminal fills the display area without image display with the scaled-up image.

Step S177, Move the part of the image that is not displayed to the border of the display area.

After the part of the image that is not displayed is obtained relative to the border of the display area, by moving the part of the image that is not displayed to the border of the display area, the display area without image display is filled with the moved image, so that the image is fitted to the display area adaptively.

By means of the process described above, after the image is moved, the part of the image that is not displayed is moved into the display area correspondingly, and the primary area is moved. The moved primary area is not displayed in the center any more, however, after the moved image is fitted to the display area, content presented in the display area of the template to the user includes more content in the image, such that the accuracy of image display is ensured and experience of the user is improved.

In an embodiment, the fitting state is that one border of the display area extends beyond the image, the adjusting the image according to the fitting state between the embedded image and the display area specifically includes the following processing: obtaining the part of the image that is not displayed corresponding to the border and moving the part of the image that is not displayed to the border of the display area.

Furthermore, it is worth mentioning that, whether in the first fitting or the subsequent second fitting after the range of the display area or the image is changed, if the display area of the template is completely filled with the embedded image when the client terminal aligns the center position of the primary area with the center position of the display area of the template, that is, the primary area is displayed in the center of the template. At this time, the fitting state between the image and the display area is that the image is fitted to the height and width of the display area, so that the client terminal does not dynamically adjust the embedded image, but directly presents the image embedded into the display area of the template to the user.

Figure 10:
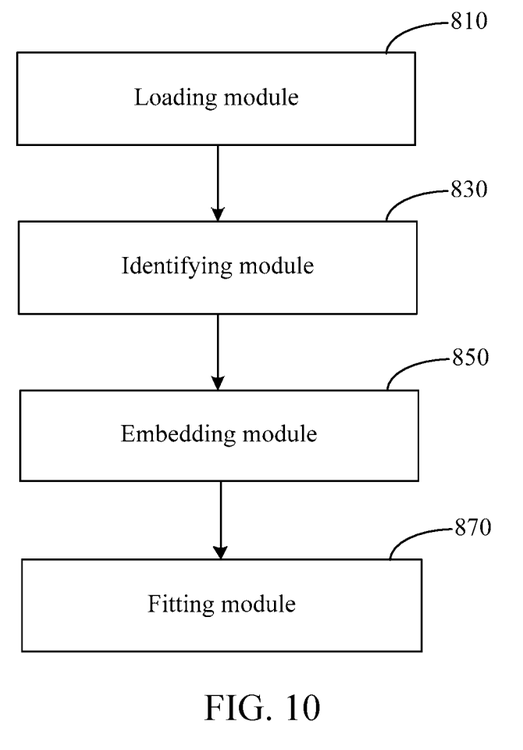
FIG. 10 is a structural block diagram of a system for controlling image display during image editing according to an embodiment.

Referring to FIG. 10, in an embodiment, an apparatus for controlling image display during image editing includes a loading module 810, an identifying module 830, an embedding module 850 and a fitting module 870.

The loading module 810 is configured to loading an obtained to-be-edited image.

The identifying module 830 is configured to identify a primary area in the loaded image.

The embedding module 850 is configured to embed the image into a preset template.

The fitting module 870 is configured to display the primary area in the center of a display area of the template and dynamically adjust the image according to a fitting state between the embedded image and the display area, so as to fit the image to the display area adaptively.

In an embodiment, the fitting module 870 is configured to display the primary area in the center of the display area of the template and adjust the image according to the fitting state between the embedded image and the display area, so as to fit the image to the display area.

In an embodiment, the apparatus described above further includes a listening module configured to listen to and obtain an operation triggering dragging a border of the display area, so as to adjust the range of the display area by means of the operation.

In an embodiment, the listening module is configured to adjust the range of the display area in response to the operation of dragging the border of the display area.

Figure 11:
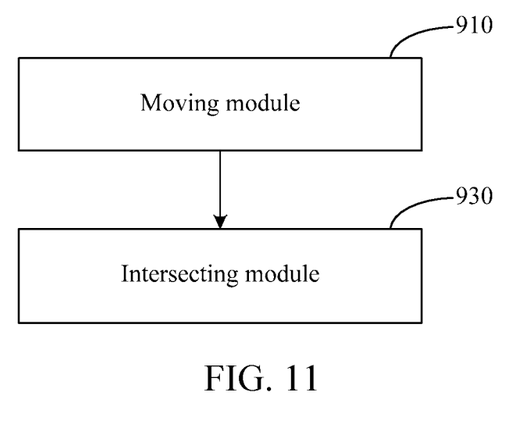
FIG. 11 is a structural block diagram of a system for controlling image display during image editing according to another embodiment.

Referring to FIG. 11, in an embodiment, the apparatus described above further includes a moving module 910 and an intersecting module 930.

The moving module 910 is configured to trigger and move a longest side on which the border is located according to the dragging direction of dragging the border and enable the longest side to stay on a current location when the operation is stopped.

The intersecting module 930 is configured to re-intersect the staying longest side with adjacent borders in display areas of the template to form a new layout of the display areas of the template.

In an embodiment, the moving module 910 is configured to move, according to the dragging direction of the operation, the longest side on which the border is located.

The intersecting module 930 is configured to re-form the display area in the template according to the location of the longest side when the operation is stopped.

Figure 12:
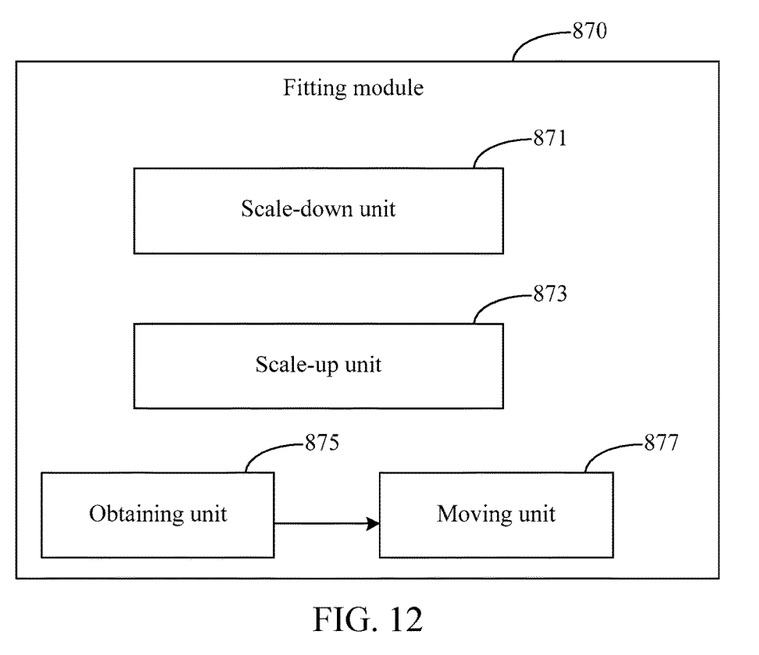
FIG. 12 is a structural block diagram of a fitting module according to an embodiment.

Referring to FIG. 12, in an embodiment, the fitting state is that the primary area extends beyond the display area, and the fitting module 870 includes a scale-down unit 871 configured to scale down the primary area by using the central position of the primary area displayed in the center as a reference.

Referring to FIG. 12, in an embodiment, the fitting state is that two opposite borders of the display area extend beyond the image, and the fitting module 870 includes a scale-up unit 873 configured to scale up the image by using the central position of the primary area displayed in the center as a reference.

Referring to FIG. 12, in an embodiment, the fitting state is that any border of the display area extends beyond the image, and the fitting module 870 includes an obtaining unit 875 and a moving unit 877.

The obtaining unit 875 is configured to obtain a part of the image that is not displayed relative to the border of the display area.

The moving unit 877 is configured to move the part of the image that is not displayed to the border of the display area.

In an embodiment, the obtaining unit 875 is configured to obtain a part of the image that is not displayed corresponding to the border.

The moving unit 877 is configured to move the part of the image that is not displayed to the border of the display area.

Figure 13:
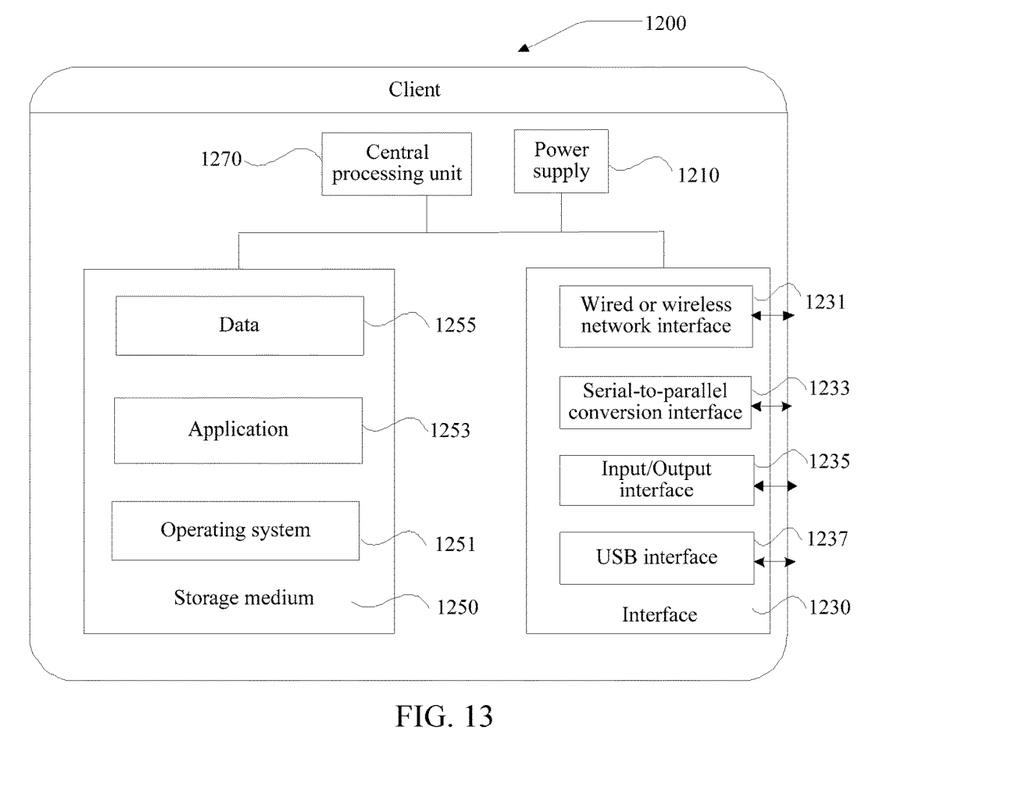
FIG. 13 is a schematic structural diagram of a client terminal according to embodiments of the present application.

Referring to FIG. 13, FIG. 13 is a schematic structural diagram of a client terminal 1200 according to an embodiment of the present application. The steps in the above embodiments performed by the client terminal cam be based on the structure of the client terminal shown in this figure.

The client terminal 1200 may vary greatly for differences in configuration or performance, and includes a power supply 1210, an interface 1230, at least one computer readable storage medium 1250 and at least one central processing unit (CPU) 1270. In some embodiments, the client terminal 1200 includes a screen (e.g., a touch screen) for displaying images and text processed by the client terminal 1200. In some embodiments, the screen is not part of the client terminal 1200 but is communicatively connected to the client terminal 1200 via a cable or wirelessly.

Specifically, the power supply 1210 is configured to supply working voltage for hardware devices on the client terminal 1200.

The interface 1230 includes at least one wired or wireless network interface 1231, at least one serial-to-parallel conversion interface 1233, at least one input/output interface 1235 and at least one USB interface 1237, configured to communicate with an external device.

The storage medium 1250, as a carrier for storing resources, may be a random storage memory, a disk or a compact disc. The resources stored on the storage medium 1250 include an operating system 1251, an application 1253 and data 1255. The storage manner may be temporary storage and non-transitory permanent storage. The operating system 1251 is configured to manage and control hardware devices on the client terminal 1200 and the application 1253, so that the central processing unit 1270 performs calculation and processing on the massive data 1255. The operating system 1251 may be Windows Server™, Mac OS X™, Unix™, Linux™, FreeBSD™ or the like. The application 1253 is a computer program based on the operating system 1251 and finishing at least one specific work. The application 1253 may include at least one module (not shown in the figure) and each module may include a series of operating instructions for the client terminal 1200. The data 1255 may be images stored in the disk or the like.

The central processing unit 1270 may include one or more processors and be set to communicate with the storage medium 1250 by means of a bus. The central processing unit 1270 is configured to calculate and process the massive data 1255 in the storage medium 1250.

The series of operating instructions stored in the storage medium 1250 is read by the central processing unit 1270 and performed on the client terminal 1200 based on the operating system 1251 on the storage medium 1250, so that some steps or all steps in the above embodiments may be finished by operating related computer programs on the client terminal.

The above descriptions are merely preferred embodiments of the present application, and are not intended to limit the solutions of the present disclosure. A person of ordinary skill in the art may make corresponding variations or modifications conveniently according to the main concepts and spirits of the present disclosure. Therefore, the protection scope of the present disclosure should be subject to the protection scope required by the claims.

What is claimed is:

1. A method for controlling image display performed at a computing device having one or more processors, a screen, and memory storing a plurality of programs to be executed by the one or more processors, the method comprising:
    loading, into the memory, a plurality of images, including at least a first image and a second image;
    identifying a respective primary area in each of the plurality of loaded images, the respective primary area including one or more objects that are automatically recognized as subjects of said each image of the plurality of loaded images;
    inserting the plurality of loaded images into a multi-splice template, wherein the multi-splice template includes multiple display areas including at least a first display area and a second display area, and wherein inserting the plurality of loaded images into the multi-splice template includes:
        inserting the first image into the first display area and the second image into the second display area of the multi-splice template;
        adjusting the respective primary area of the first image in accordance with a first fitting state between the first image and the first display area in the multi-splice template; and
        adjusting the respective primary area of the second image in accordance with a second fitting state between the second image and the second display area in the multi-splice template;
    detecting a user input adjusting a first border of the first display area, wherein the adjusting of the first border of the first image causes a first change in the first display area and the second change in a second display area of the multi-splice template; and
    in response to detecting the user input adjusting the first border of the first image, adjusting the respective primary area of the first image in a first manner to fit the first display area, and adjusting the respective primary area of the second image in a second manner to fit the second display area, wherein:
        the adjusting in the first manner is distinct from the adjusting in the second manner,
        respective centers of the respective primary areas of the first and second images are located at respective centers of the first and second display areas in the multi-splice template before and after the first border of the first image is adjusted by the user input, and
        the first and second display areas in the multi-splice template are occupied completely by the respective primary areas of the first and second images, respectively, before and after the first border of the first image is adjusted by the user input.

2. The method according to claim 1, wherein detecting the user input adjusting the first border of the first display area comprises:
    moving, according to a dragging direction of the user input, a longest side in the multi-splice template on which the first border is located; and
    re-forming the multiple display areas in the multi-splice template according to a location of the longest side when the user input is stopped.

3. The method according to claim 1, wherein the first fitting state is dependent upon at least one of a size comparison of the first image and the first display area of the multi-splice template and a position of the respective primary area in the first image.

4. The method according to claim 1, wherein adjusting the respective primary area of the first image in accordance with the first fitting state between the first image and the first display area of the multi-splice template is a combination of changing a size of the first image by a ratio determined by the first fitting state and shifting the first image by an offset determined by the first fitting state.

5. The method according to claim 1, wherein, when the first fitting state indicates that the respective primary area of the first image extends beyond the first display area in both a vertical direction and a horizontal direction, the respective primary area of the first image is reduced by a ratio determined by the first fitting state such that the reduced primary area of the first image no longer extends beyond the first display area in at least one of the vertical direction and the horizontal direction.

6. The method according to claim 1, wherein, when the first fitting state indicates that the first image is within two opposite borders of the first display area along a predefined direction, the first image is enlarged by a ratio determined by the first fitting state such that the enlarged first image is no longer within the two opposite borders of the first display area along the predefined direction.

7. The method according to claim 1, wherein, when the first fitting state indicates that the first image is within at least one border of the first display area along a predefined direction, the first image is shifted by an offset determined by the first fitting state such that the shifted first image is no longer within the at least border of the display area alone the predefined direction.

8. A computing device for controlling image display, comprising:
one or more processors;
a screen;
memory; and
a plurality of programs stored in the memory that, when executed by the one or more processors, cause the computing device to perform a plurality of operations including:
loading, into the memory, a plurality of images, including at least a first image and a second image;
identifying a respective primary area in each of the plurality of loaded images, the respective primary area including one or more objects that are automatically recognized as subjects of said each image of the plurality of loaded images;
inserting the plurality of loaded images into a multi-splice template, wherein the multi-splice template includes multiple display areas including at least a first display area and a second display area, and wherein inserting the plurality of loaded images into the multi-splice template includes:
inserting the first image into the first display area and the second image into the second display area of the multi-splice template;
adjusting the respective primary area of the first image in accordance with a first fitting state between the first image and the first display area in the multi-splice template; and
adjusting the respective primary area of the second image in accordance with a second fitting state between the second image and the second display area in the multi-splice template;
detecting a user input adjusting a first border of the first display area, wherein the adjusting of the first border of the first image causes a first change in the first display area and the second change in a second display area of the multi-splice template; and
in response to detecting the user input adjusting the first border of the first image, adjusting the respective primary area of the first image in a first manner to fit the first display area, and adjusting the respective primary area of the second image in a second manner to fit the second display area, wherein:
the adjusting in the first manner is distinct from the adjusting in the second manner,
respective centers of the respective primary areas of the first and second images are located at respective centers of the first and second display areas in the multi-splice template before and after the first border of the first image is adjusted by the user input, and
the first and second display areas in the multi-splice template are occupied completely by the respective primary areas of the first and second images, respectively, before and after the first border of the first image is adjusted by the user input.

9. The computing device according to claim 8, wherein detecting the user input adjusting the first border of the first display area comprises:
moving, according to a dragging direction of the user input, a longest side in the multi-splice template on which the first border is located; and
re-forming the multiple display areas in the multi-splice template according to a location of the longest side when the user input is stopped.

10. The computing device according to claim 8, wherein the first fitting state is dependent upon at least one of a size comparison of the first image and the first display area of the multi-splice template and a position of the respective primary area in the first image.

11. The computing device according to claim 8, wherein adjusting the respective primary area of the first image in accordance with the first fitting state between the first image and the first display area of the first display the multi-splice template is a combination of changing a size of the first image by a ratio determined by the first fitting state and shifting the first image by an offset determined by the first fitting state.

12. The computing device according to claim 8, wherein, when the first fitting state indicates that the respective primary area of the first image extends beyond the first display area in both a vertical direction and a horizontal direction, the respective primary area of the first image is reduced by a ratio determined by the first fitting state such that the reduced primary area of the first image no longer extends beyond the first display area in at least one of the vertical direction and the horizontal direction.

13. The computing device according to claim 8, wherein, when the first fitting state indicates that the first image is within two opposite borders of the first display area along a predefined direction, the first image is enlarged by a ratio determined by the first fitting state such that the enlarged first image is no longer within the two opposite borders of the first display area along the predefined direction.

14. The computing device according to claim 8, wherein, when the first fitting state indicates that the first image is within at least one border of the first display area along a predefined direction, the first image is shifted by an offset determined by the first fitting state such that the shifted first image is no longer within the at least border of the display area along the predefined direction.

15. A non-transitory computer readable storage medium in connection with a computing device having one or more processors, memory and a screen for controlling image display, the storage medium storing a plurality of programs that, when executed by the one or more processors, cause the computing device to perform a plurality of operations including:
loading, into the memory, a plurality of images, including at least a first image and a second image;
identifying a respective primary area in each of the plurality of loaded images, the respective primary area including one or more objects that are automatically recognized as subjects of said each image of the plurality of loaded images;

inserting the plurality of loaded images into a multi-splice template, wherein the multi-splice template includes multiple display areas including at least a first display area and a second display area, and wherein inserting the plurality of loaded images into the multi-splice template includes:

inserting the first image into the first display area and the second image into the second display area of the multi-splice template;

adjusting the respective primary area of the first image in accordance with a first fitting state between the first image and the first display area in the multi-splice template; and adjusting the respective primary area of the second image in accordance with a second fitting state between the second image and the second display area in the multi-splice template;

detecting a user input adjusting a first border of the first display area, wherein the adjusting of the first border of the first image causes a first change in the first display area and the second change in a second display area of the multi-splice template; and in response to detecting the user input adjusting the first border of the first image, adjusting the respective primary area of the first image in a first manner to fit the first display area, and adjusting the respective primary area of the second image in a second manner to fit the second display area, wherein:

the adjusting in the first manner is distinct from the adjusting in the second manner, respective centers of the respective primary areas of the first and second images are located at respective centers of the first and second display areas in the multi-splice template before and after the first border of the first image is adjusted by the user input, and the first and second display areas in the multi-splice template are occupied completely by the respective primary areas of the first and second images, respectively, before and after the first border of the first image is adjusted by the user input.

16. The computer readable storage medium according to claim 15, wherein detecting the user input adjusting the first border of the first display area comprises:

moving, according to a dragging direction of the user input, a longest side in the multi-splice template on which the first border is located; and re-forming the multiple display areas in the multi-splice template according to a location of the longest side when the user input is stopped.

17. The computer readable storage medium according to claim 15, wherein the first fitting state is dependent upon at least one of a size comparison of the first image and the first display area of the multi-splice template and a position of the respective primary area in the first image.

18. The computer readable storage medium according to claim 15, wherein adjusting the respective primary area of the first image in accordance with the first fitting state between the first image and the first display the first display area of the multi-splice template is a combination of changing a size of the first image by a ratio determined by the first fitting state and shifting the first image by an offset determined by the first fitting state.

19. The computer readable storage medium according to claim 15, wherein, when the first fitting state indicates that the respective primary area of the first image extends beyond the first display area in both a vertical direction and a horizontal direction, the respective primary area of the first image is reduced by a ratio determined by the first fitting state such that the reduced primary area of the first image no longer extends beyond the first display area in at least one of the vertical direction and the horizontal direction.

20. The computer readable storage medium according to claim 15, wherein, when the first fitting state indicates that the first image is within two opposite borders of the first display area along a predefined direction, the first image is enlarged by a ratio determined by the first fitting state such that the enlarged first image is no longer within the two opposite borders of the first display area along the predefined direction.

* * * * *